US007186390B1

(12) United States Patent
Hellbusch et al.

(10) Patent No.: US 7,186,390 B1
(45) Date of Patent: Mar. 6, 2007

(54) BRINE MAKER

(75) Inventors: James A. Hellbusch, Columbus, NE (US); Dale L. Plugge, Columbus, NE (US)

(73) Assignee: Duolift Mfg. Co., Inc., Columbus, NE (US)

( * ) Notice: Subject to any disclaimer, the term of this patent is extended or adjusted under 35 U.S.C. 154(b) by 871 days.

(21) Appl. No.: 09/970,594

(22) Filed: Oct. 4, 2001

(51) Int. Cl.
*B01D 11/02* (2006.01)

(52) U.S. Cl. ........................ 422/278; 422/902; 406/48; 406/137; 406/194

(58) Field of Classification Search ................ 422/261, 422/269, 278, 902; 239/677, 650, 662, 668; 137/268, 576; 366/15, 41, 34, 45, 138, 167.1, 366/173.1, 173.2, 183.1, 183.2, 185; 406/136, 406/137, 48, 194
See application file for complete search history.

(56) References Cited

U.S. PATENT DOCUMENTS

| | | | | |
|---|---|---|---|---|
| 1,642,445 | A | 9/1927 | Jacobson | |
| 1,839,532 | A | 1/1932 | Calhoun | |
| 1,989,416 | A | 1/1935 | Hartman | 83/18 |
| 3,072,387 | A | 1/1963 | Heise | 259/150 |
| 3,419,223 | A | 12/1968 | Morin | 241/73 |
| 3,833,123 | A * | 9/1974 | Walker | 210/241 |
| 4,258,011 | A * | 3/1981 | Prazmowski | 422/273 |
| 4,411,778 | A | 10/1983 | Venable | 209/246 |
| 4,462,511 | A | 7/1984 | Fulmer et al. | 222/52 |
| 4,510,114 | A * | 4/1985 | Nelson | 264/261 |
| 4,807,854 | A * | 2/1989 | Mitchell | 266/168 |
| 4,863,277 | A * | 9/1989 | Neal et al. | 366/137 |
| 5,082,555 | A * | 1/1992 | Read | 209/244 |
| 5,110,366 | A * | 5/1992 | McGregor | 134/22.11 |
| 5,474,241 | A | 12/1995 | Kennedy | 241/81 |
| 5,775,237 | A * | 7/1998 | Reilly et al. | 110/234 |
| 5,819,776 | A | 10/1998 | Kephart | 137/1 |
| 5,983,908 | A * | 11/1999 | Bradley | 134/57 D |
| 6,068,200 | A | 5/2000 | Kime | 239/7 |
| 6,165,323 | A * | 12/2000 | Shearer | 162/251 |

* cited by examiner

*Primary Examiner*—E. Leigh McKane
(74) *Attorney, Agent, or Firm*—Thomte, Mazour & Niebergall; Shane M. Niebergall

(57) ABSTRACT

An improved brine maker includes a hopper having open upper and lower ends, a solids screen, and a receiving tank having an open upper end and closed lower end. The solids screen and receiving tank are pivotally secured to the hopper adjacent its lower end. The receiving tank and solids screen pivot freely and independently of the hopper to provide quick and easy access for cleaning and maintenance. Rotatable spray bars are positioned within the hopper to direct the dissolving fluid at the soluble material within the hopper. Spray holes having varying diameters and spaced relation to one another customize the fluid spray pattern for greater efficiency. A hydraulic assembly assists the operator throughout the cleaning and maintenance operations of the brine maker to reduce the time and manpower required.

14 Claims, 7 Drawing Sheets

BRINE MAKER

BACKGROUND OF THE INVENTION

1. Field of the Invention

This invention relates to devices for dissolving solid material into liquid and more particularly to a brine maker that can be efficiently operated, cleaned, and maintained.

2. Description of the Prior Art

Salt brine production systems, also known as brine makers, have been used for hundreds of years in many different industries and applications. For example, several state road departments spray liquids, including salt brine, onto road surfaces before winter storms. They also spray these liquids onto dry salt-sand mixtures just before the mixtures are spread onto the roadways. Both methods, if done properly, have proved to be successful in de-icing roads and preventing road surfaces from freezing in the first place.

The general method for making salt brine has not changed over the years. In a downward flow brine maker, salt is loaded into a salt hopper, which is placed directly above a brine hopper. A salt screen is disposed between the salt hopper and brine hopper to retain the salt inside the salt hopper. Water is introduced to the salt hopper and dissolves the salt, forming the brine, which flows downward into the brine hopper. The brine collects in the brine hopper until it is later pumped into a holding tank. This basic brine maker design suffers from one key deficiency; clean-out is difficult and time-consuming. To properly clean the brine maker, the operator must, customarily, climb a ladder placed alongside the brine maker and physically enter the salt hopper to shovel the debris into a loader over the walls of salt hopper bucket and manually haul each bucket of debris out of the salt hopper. Thereafter, the operator could scrub the inside of the hopper and the upper surface of the salt screen. Access to the interior of the brine hopper and lower surface of the salt screen is typically gained by manually removing the brine hopper from the system. The time and resources spent on cleaning the brine maker are costly and bothersome.

A routine and thorough cleaning of the brine maker is necessary because many state road departments use standard rock salt, which is usually quite dirty, to make their brine. Some states allow up to 10% debris/dirt in their specifications for rock salt. The debris and dirt collects in both the salt hopper and the brine holding tank. Many operators delay cleaning their brine makers because it takes too long and requires valuable resources. However, when the brine makers are not regularly cleaned, the speed and efficiency of the brine production process is greatly reduced. Eventually, the system begins to back up. The operator is usually unaware of the problem until the fluid has completely filled the salt hopper and begins to overflow. Clean-up at that point is made extremely difficult. Accordingly, the operator must choose between the excessive time and work of cleaning the brine maker and reducing the speed and efficiency that they are capable of producing brine.

One previous attempt at making a brine maker that was easy to clean provided a removable salt hopper. A bracket was welded to the salt hopper so that the operator could couple his front end loader to the salt hopper. The operator was then able to remove the salt hopper and drive it to a particular location and dump the debris out of the salt hopper. While this brine maker concept was an improvement over previous brine makers as far as clean-out is concerned, it still suffered from two key flaws. First, the operator would have to disconnect the bucket from his front end loader before attaching the loader to the removable salt hopper.

This consumes a lot of time, especially when trying to align the loader pins with the salt hopper bucket. After the operator has then placed the removable salt hopper back onto the brine maker, he must re-attach the bucket to the loader in order to add more salt to the salt hopper. The operator must also disconnect and reconnect the liquid inlet lines to the removable salt hopper. Moreover, silt still collects in the brine hopper, and there is no easy way to clean the silt out. If the silt is not cleaned out, suspended solids will collect in the brine storage tanks and silt will eventually clog the suction port that leads to the brine discharge pump.

Another prior art brine maker design provided a brine hopper that was pivotally connected to a frame that supported the brine maker, adjacent to the lower end of the salt hopper. Accordingly, the brine hopper could be pivoted down and away from the salt hopper so that silt and other debris could be manually removed. The design further incorporated a complex hydraulic assembly that could tip the entire salt hopper forward and away from the frame until its sides were at or beyond horizontal. In this position, the operator could have access to the interior of the salt hopper and the salt screen, which was permanently fixed at the bottom thereof, for cleaning and maintenance. The hydraulic assembly further provided a means for selectively pivoting the brine hopper between open and closed positions. While this design improved the ease with which brine makers could be cleaned, it too had several shortcomings. First, the complexity of the design and hydraulics system increased the unit's costs and manufacturing time. Second, the unit required a greater working area to pivot the salt hopper. The pivoting salt hopper further complicated the engineering and maintenance of the fluid inlet lines. Moreover, cleaning and maintenance of the salt screen and brine hopper were still somewhat cumbersome.

Another shortcoming of prior art brine makers includes their method of introducing water to the salt load in the salt hopper. In these designs, water is piped to the top of the salt hopper. The water then enters the salt hopper via one or more spray bars that extend horizontally along the sides of the salt hopper. Small holes are drilled along the length of the spray bars to provide a uniform spray pattern. As the water exits the spray bars, it is directed at a fixed location into the salt load. However, when the salt is dumped into the hopper, it creates a natural cone-shape. Therefore, the even horizontal spray effectively strikes the salt load in the center, but the sides of the spray are fired ineffectively into the opposite side of the salt hopper. The salt load dissolves more efficiently when it is directly impacted by the water spray. The shortcomings of this design are only accentuated as the salt load decreases in size and the fixed water stream eventually begins firing directly over the salt load.

Accordingly, what is needed is a brine maker that efficiently dissolves solid material and is easy to clean and maintain without increasing the cost and complexity of manufacture.

SUMMARY OF THE INVENTION

The brine maker of the present invention efficiently produces liquid compounds and is easy to clean and maintain. Salt is loaded into the salt hopper using a front end loader or similar machine. Fluid is provided to positionable spray bars, disposed within the salt hopper. As the fluid stream exits the spray bars and dissolves the salt, or other dissolvable material, it passes through a solids screen that filters unwanted particulate away from the "brine." The brine temporarily collects in a receiving tank, positioned below the salt hopper and solids screen. The brine can then be pumped to remote storage tanks or pumped back into the salt hopper, via the spray bars, to increase the concentration of the brine.

The positionable spray bars are rotatably mounted within the salt hopper so that the operator can adjust the fluid spray as the volume of dissolvable material within the hopper changes. The spray bars have spray holes arranged along the length of the spray bars. The spacing between the holes, as well as their individual diameters, are varied to position the larger of the holes in close relation to one another in the middle of the spray bars. The smaller of the holes are spaced more distantly from one another and are located proximal the ends of the spray bars. This arrangement concentrates the fluid spray on the dissolvable material (due to the conical-shape that the material tends to take as it is dumped into the hopper) to increase the efficiency of the brine maker.

The improvements of the present invention allow for fast and simple cleaning and maintenance. When the brine maker has to be cleaned, the operator simply positions the bucket of a front end loader beneath the receiving tank. A second operator then selects a hydraulic control switch, which activates a self-contained hydraulic pump, and shifts the hydraulic control valve. This retracts a pair of hydraulic cylinders, which pivot the receiving tank and solids screen downward so that the debris, which was inside the upper salt hopper, falls into the loader bucket. The operator then simply reselects the hydraulic control switch to pivot the receiving tank upwards. The operator engages a solids screen retaining pin to hold the solids screen against the hopper and pivots the receiving tank back down again. In this position, the silt may be removed from the receiving tank with a hose and squeegee. With the bucket of the front end loader placed beneath the receiving tank, the silt can be simply dumped into the bucket for disposal.

Accordingly, it is one of the important objects of the present invention to provide an improved brine maker that is easy and efficient to operate, as well as simple and quick to clean and maintain.

Another important object of the invention is to provide a brine maker having a brine receiving tank that is pivotally mounted to the brine maker for easy cleaning and maintenance.

An additional object of the invention is to provide a brine maker having a pivotable solids screen to provide easy access to the interior of the salt hopper and the receiving tank for simple cleaning and maintenance.

Still another object of the invention is to provide a brine maker that is at least partially operated by a hydraulic assembly to reduce the amount of time and manpower to clean and maintain the device.

Another important object of the invention is to provide a brine maker having rotatable spray bars so that the operator can adjust the fluid spray as it enters the salt hopper to adjust for the changing height in dissolvable material within the brine maker.

An additional object of the invention is to provide a brine maker having spray bars with holes that vary in diameter so that the spray pattern is customized for greater efficiency.

Yet another object of the invention is to provide a brine maker with spray bars having holes disposed thereon at varied distances to customize the spray pattern for greater efficiency.

A further object of the invention is to provide a brine maker that is relatively inexpensive and simple to manufacture.

These and other objects will be apparent to those skilled in the art.

DESCRIPTION OF THE PREFERRED EMBODIMENT

The system for producing liquid compositions of the present invention will be generally referred to as the brine maker 10. It will be understood by one of ordinary skill in the art that, while the brine maker 10 herein will be described as producing salt brine, a wide range of liquid compositions could be made using the present device with few, if any, modifications.

Figure 6:
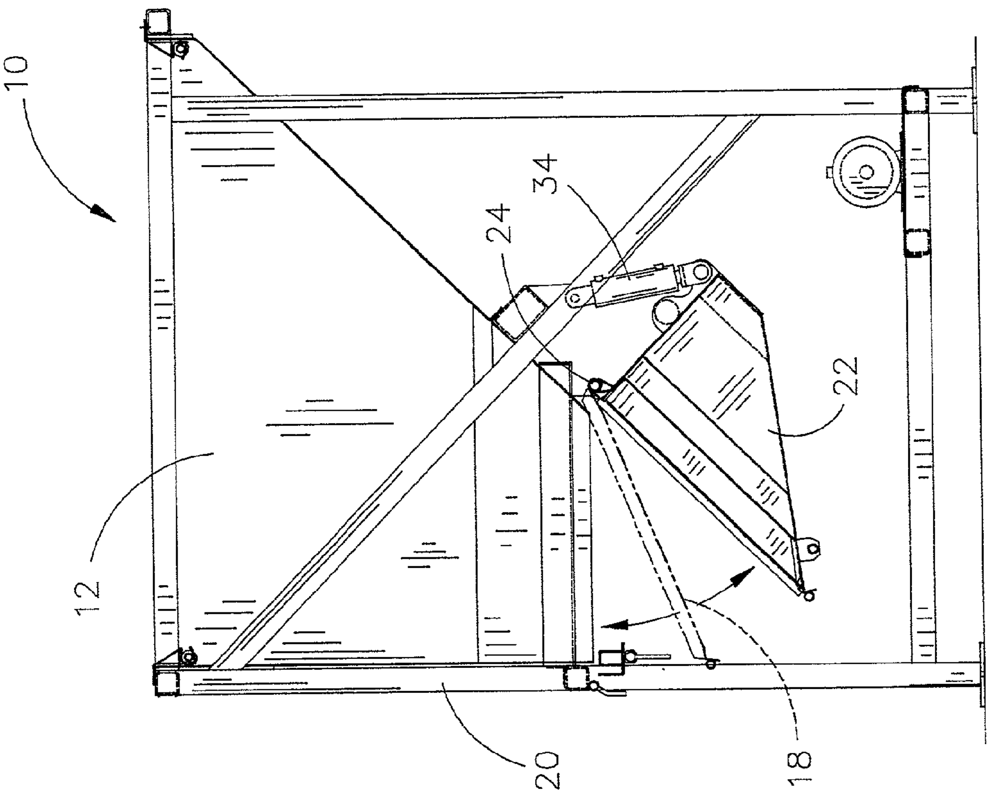
FIG. 6 illustrates the pivoting motion of the salt screen of the brine maker when the brine hopper of FIG. 5 is in its open position.
Figure 5:
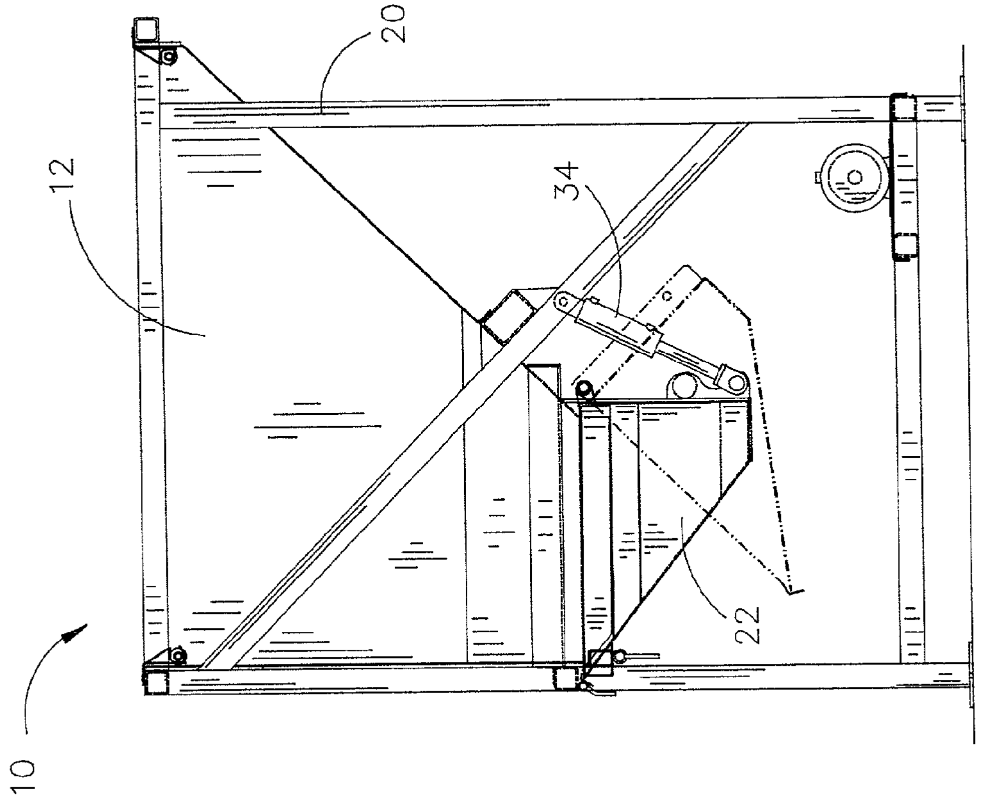
FIG. 5 illustrates the pivoting motion of the brine hopper of the brine maker between open and closed positions.

The brine maker 10 for producing salt brine, shown in FIGS. 1 through 6, 10, and 11, is generally provided with a salt hopper 12, having at least a first opening 14 for receiving soluble materials, such as rock salt, and a second opening 16 for the passage of the liquid composition through a solids screen 18, which forms the base of salt hopper 12. The salt hopper 12 is secured to a frame 20 adjacent the upper end thereof. A brine hopper, or receiving tank 22, having an open top and closed bottom, is operatively and pivotally coupled to salt hopper 12 at hinge 24. Accordingly, receiving tank 22 can be pivoted between a closed position and an open position as shown in FIGS. 5 and 6. The open top of receiving tank 22 should be sized to correspond to the dimensions of the second opening 16 of salt hopper 12 so that fluids may pass cleanly from salt hopper 12 into receiving tank 22.

Figure 2:
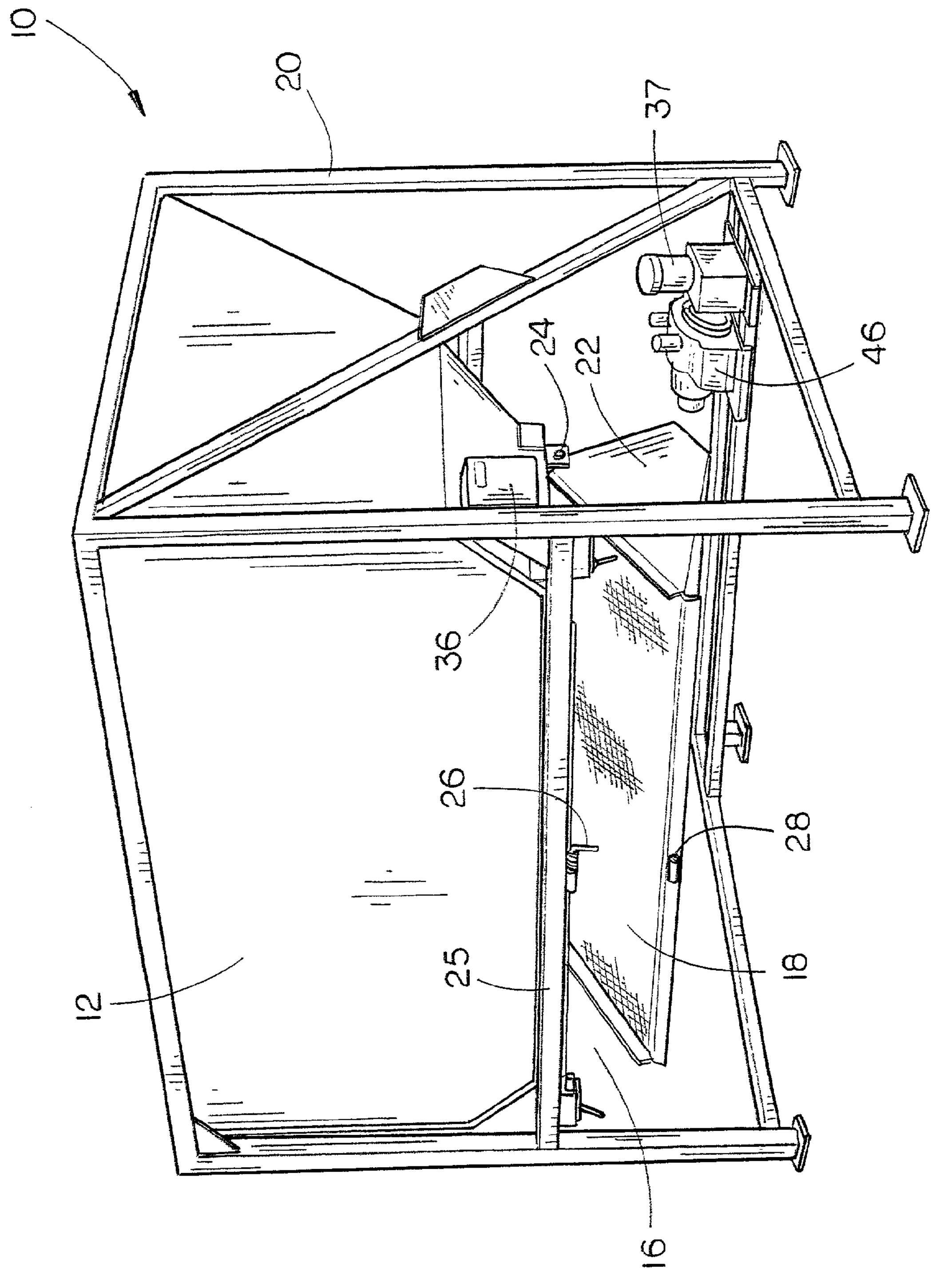
FIG. 2 is a front perspective view of the brine maker of the present invention.
Figure 4:
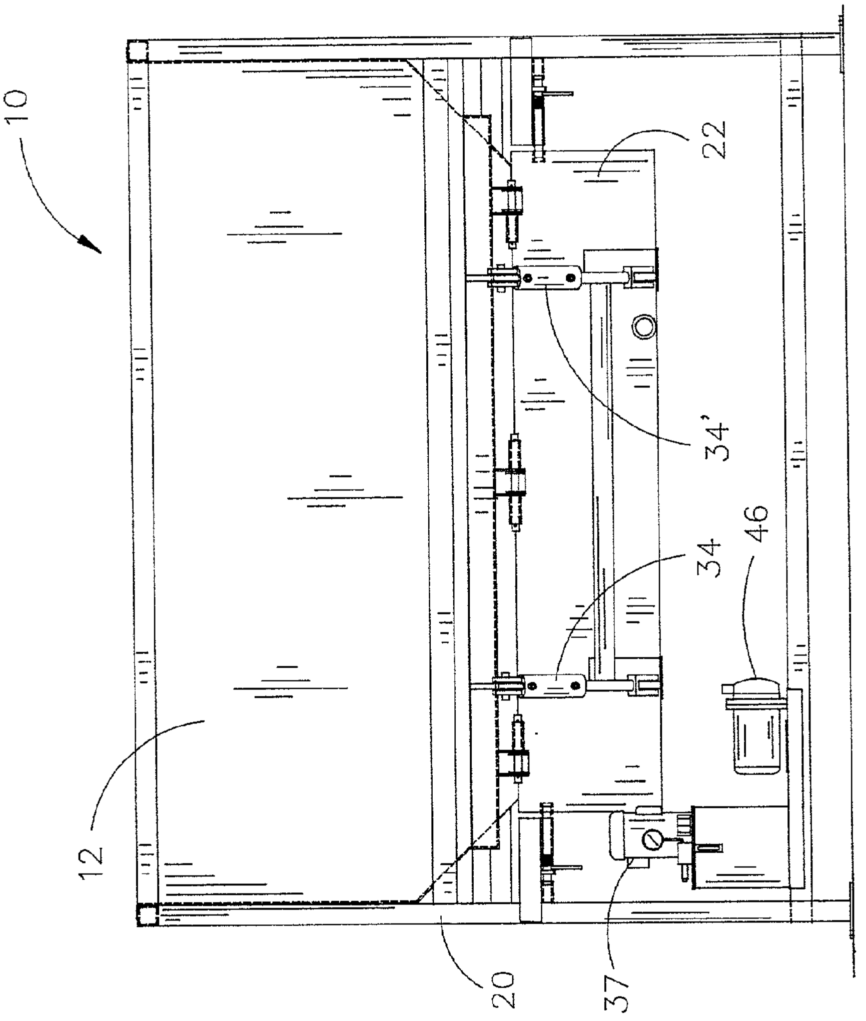
FIG. 4 is a rear elevation view of the brine maker of the present invention.
Figure 3:
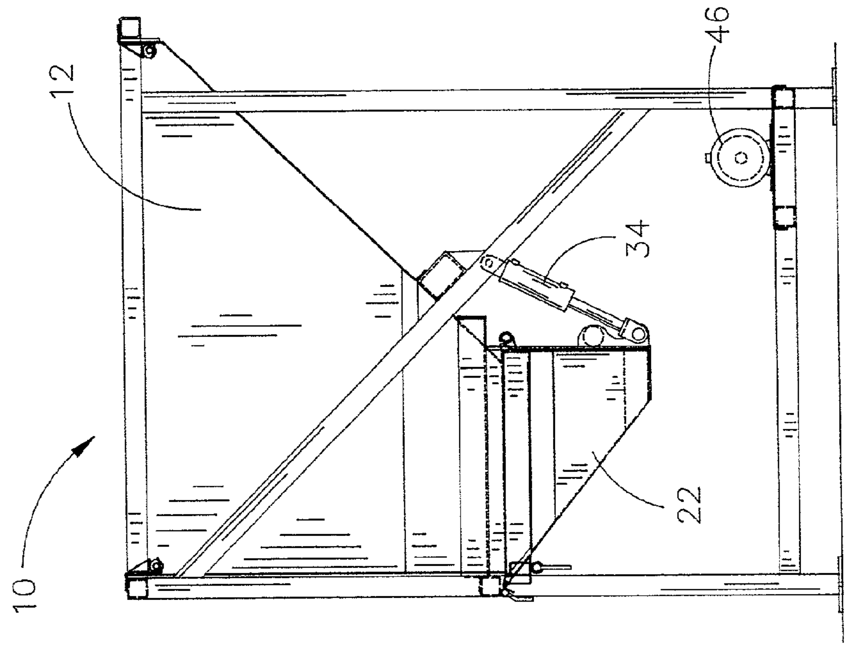
FIG. 3 is side elevation view of the brine maker of the present invention.

The frame 20 should be of sturdy but simple construction. While it is preferred that carbon steel is used for the component parts of frame 20, it is contemplated that a range of other metals or polymers could be used. Frame 20 has an upper end and a lower end comprised of horizontal frame members. The upper and lower ends of frame 20 are connected by a plurality of vertical and diagonal frame members. Frame 20 is provided with a removable frame member 25. Frame member 25 can be bolted into a horizontal position adjacent the second opening 16 of salt hopper 12, as shown in FIG. 2. In this position, frame member 25 serves to stabilize frame 20 and locate solids screen retaining pin 26, and the receiving tank pins 30 for the securement of solids screen 18 and receiving tank 22. This position also allows the bucket of a front end loader to be positioned between the brine maker 10 and the floor, for cleaning functions discussed below. When the brine maker 10 must be moved, frame member 25 can be bolted into a horizontal position in planar harmony with the horizontal supports adjacent the lower end of frame 20. In this position, a forklift can easily lift and transport the brine maker 10 to a new location.

Figure 1:
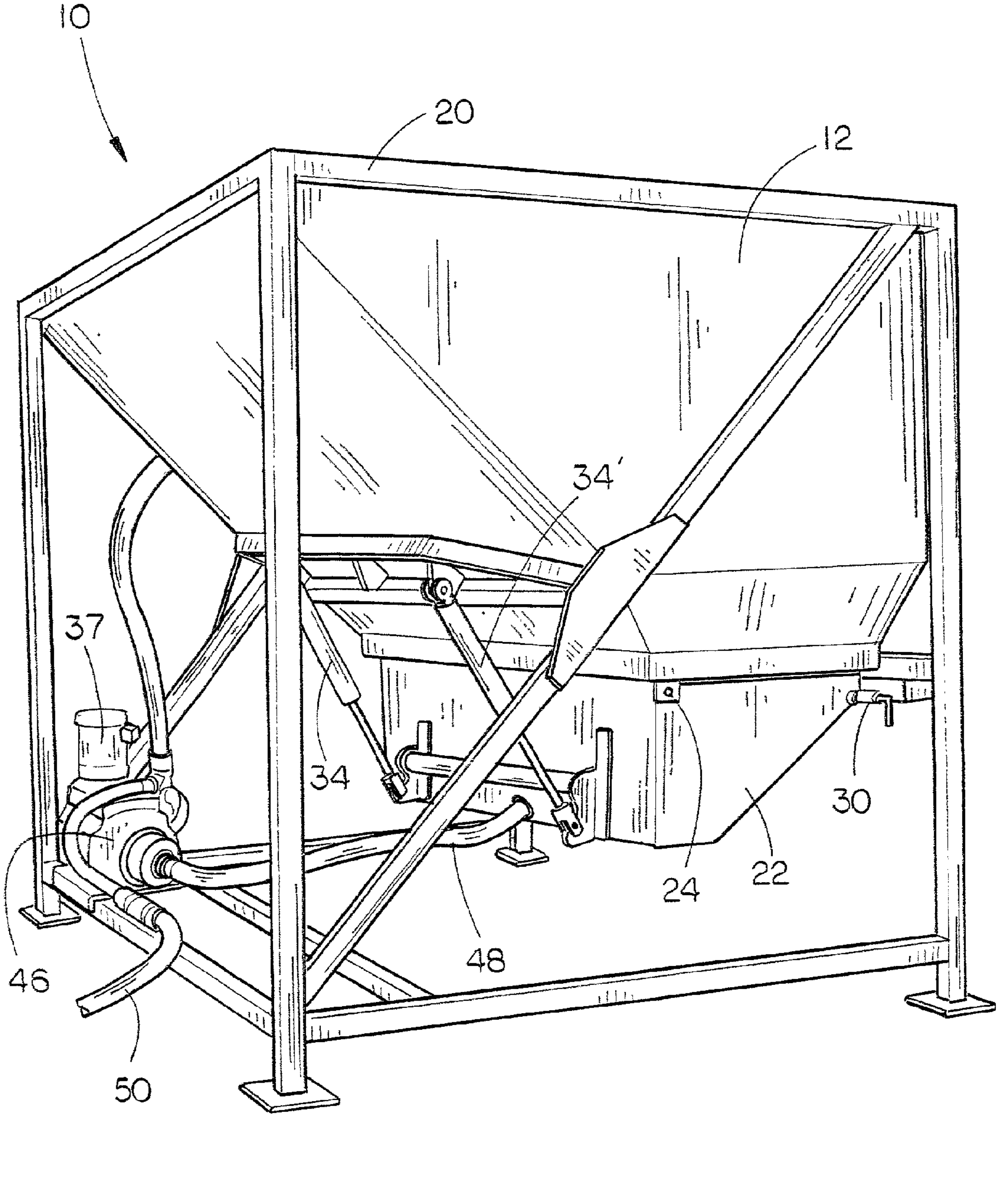
FIG. 1 is a rear perspective view of the brine maker of the present invention.
Figure 9:
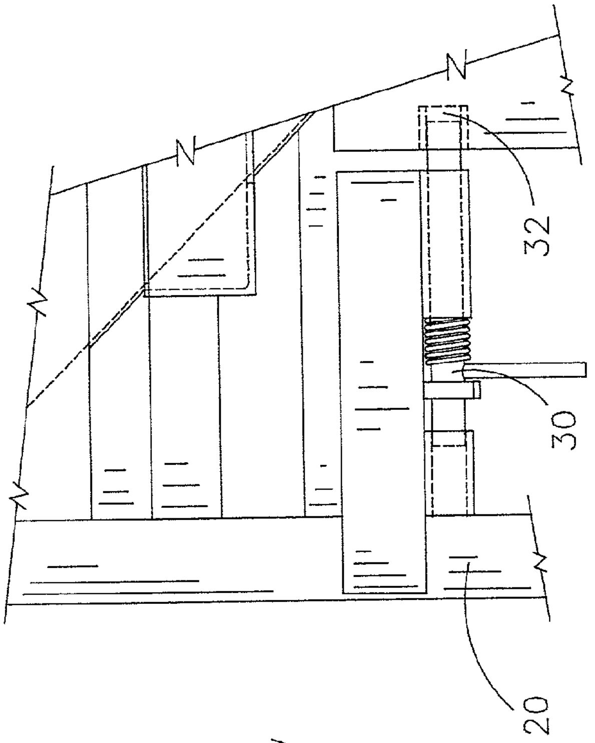
FIG. 9 is a front view of the brine hopper retaining bolt of the brine maker of the present invention.
Figure 8:
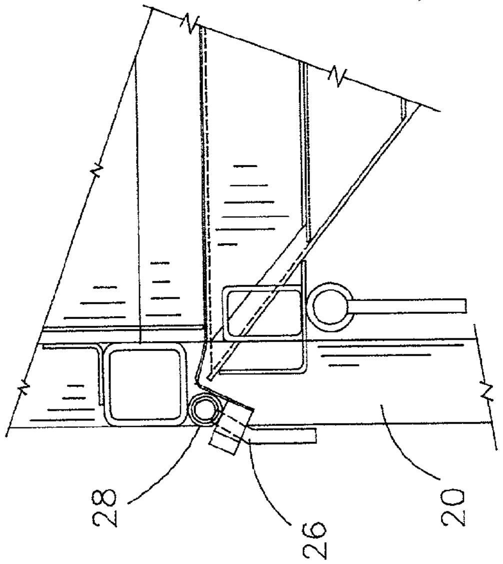
FIG. 8 is a side view of the salt screen and brine hopper retaining bolts of the brine maker of the present invention.
Figure 7:
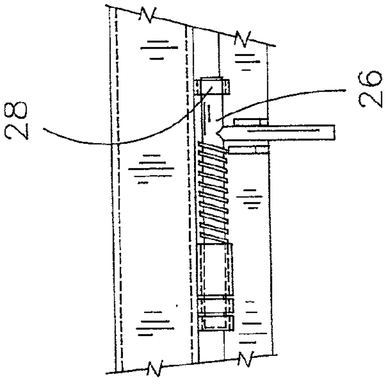
FIG. 7 is a front view of the salt screen retaining bolt of the brine maker of the present invention.
Figure 10:
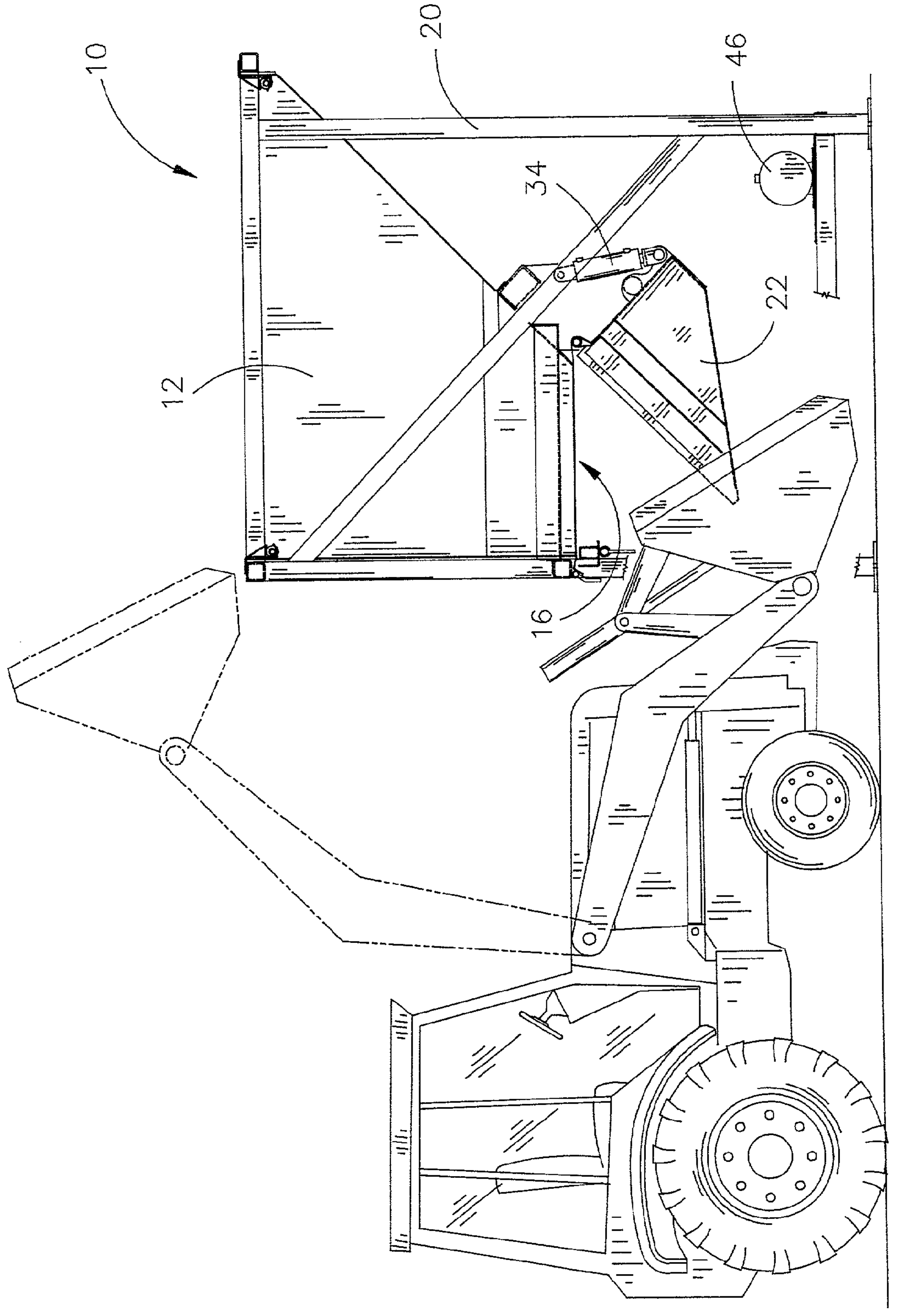
FIG. 10 illustrates the ease with which a front-loader can selectively load and unload solid material from the brine maker.

Solids screen 18 is preferably formed from a stainless steel screen but could be formed from any corrosion-resistant perforated material. Solids screen 18 is pivotally connected to salt hopper 12 and receiving tank 22 at hinge 24. Accordingly, when receiving tank 22 is in its open position, solids screen 18 can be freely pivoted to any point along the arc extending between the second opening 16 of salt hopper 12 and the open top of receiving tank 22 as shown in FIG. 6. A solids screen retaining pin 26 and collar 28 are disposed at the forward edge of solids screen 18, for selectively, manually locking solids screen 18 in a position closely adjacent the second opening 16 of salt hopper 12. Accordingly, when the solids screen retaining pin 26 is secured within collar 28, as shown in FIG. 7, and the receiving tank 22 is moved into its open position, the operator is provided with easy access to the underside of solids screen 18 and the interior compartment of receiving tank 22. Similarly, when the solids screen retaining pin 26 is disengaged from collar 28, as shown in FIG. 2, the solids screen 18 will pivot downwardly with receiving tank 22 when it is moved into its open position. In this position, the operator is provided with easy cleaning and maintenance access to the upper surface of solids screen 18 and the interior of salt hopper 12. At least two receiving tank retaining pins 30 and receptacles 32 are provided for manually locking the receiving tank 22 in its closed position as shown in FIGS. 1 and 9.

A hydraulic assembly is provided with cylinders 34 and 34', a control panel 36, and a hydraulic pump 37. The hydraulic assembly allows the user to selectively move the receiving tank 22 between its open and closed positions automatically. It is contemplated that the hydraulic assembly may have one or more cylinders and a varying degree of complexity as the particular use requires.

Figure 11:
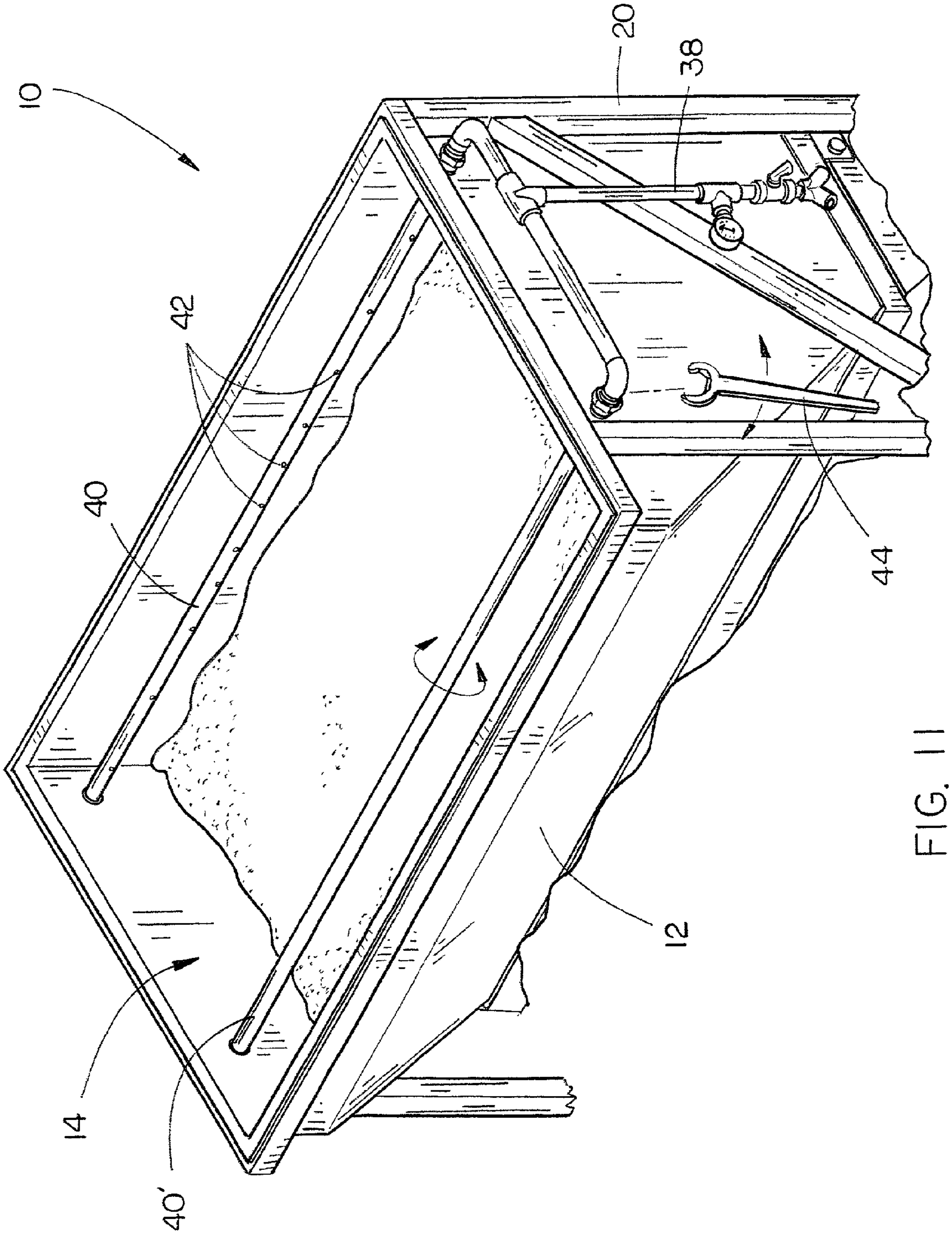
FIG. 11 is an upper perspective view of the brine maker of the present invention illustrating the rotational motion of the forward and rearward spray bars.

A fluid inlet line 38 extends to the top of salt hopper 12 where it is connected to two spray bars 40 and 40'. Fluid inlet line 38 is preferably provided with two couplings, as shown in FIG. 11. The first coupling receives fresh water directly from a common city water line. The pressure provided by typical city water supplies is usually sufficient to operate the system. However, it is contemplated that a pump or similar means could be used for water services that are not under pressure or lack the desired pressure level. The second coupling is used to return salt brine to the salt hopper for reasons discussed below.

While it is contemplated that one or more spray bars could be used in the present application, it is preferred that two spray bars be used to provide opposing streams of water for dissolving the salt load within salt hopper 12. Spray bars 40 and 40' are provided with a plurality of openings 42 along the length thereof. To provide for a greater efficiency in dissolving salt loads, which tend to be generally conical in shape when dumped into the hopper 12 from above, the spacing between the openings 42 are varied so that the holes proximate the center point of the spray bars 40 and 40' are closer to one another than the holes proximate the ends of spray bars 40 and 40'. Moreover, the holes 42 should vary in diameter. Particularly, the diameter of the holes 42 should gradually increase in size as their distance to the midpoint of the spray bars 40 and 40' decreases. Accordingly, the larger holes will be positioned near the center of the spray bars 40 and 40'. Therefore, as fluid is pumped through the spay bars 40 and 40', the spray that exits the center holes 42 will have a greater volume and concentration than the spray pattern exiting from the ends of spray bars 40 and 40'.

Spray bars 40 and 40' are rotatably mounted so that the operator can vary the vertical pitch of the fluid spray that is being directed at the salt load. This allows the operator to optimize the spray stream, whereas a fixed position stream would tend to be aimed either too high or too low, depending on the volume of salt in the load. The rotation of spray bars 40 and 40' can either be achieved manually using a wrench 44 or they can be adjusted automatically using an electric or hydraulic pump (not shown).

In an alternate embodiment, solid stream nozzles (not shown) having an oscillating spray pattern could be used in place of, or in combination with, the holes 42. The use of such oscillating solid stream nozzles will tend to dissolve the salt load more quickly since the oscillation of the nozzles will impact a greater surface area of the salt load at one time.

A fluid pump 46, as illustrated in FIG. 1, serves a dual role. When making salt brine, fluid pump 46 delivers recycled salt brine that is received from line 48, which connects the receiving tank 22 to the fluid pump 46, to fluid inlet line 38 and spray bars 40 and 40', when it is determined that the salinity level of the brine being produced is insufficient. When it is determined that the salt brine is at the appropriate salinity level, the pump delivers the salt brine to virtually any remote holding tank or applicator truck via line 50.

A float switch (not shown) is strategically placed on the inside of salt hopper 12 to detect the occurrence of a fluid overflow, due to a plugged solids screen, a discharge pump failure, or other similar malfunction. Once the float switch has detected the rising water level, a warning is provided to the operator to manually shut down the system. It is further contemplated that the float switch could be directly coupled to an automatic shut-off valve incorporated in fluid inlet line 38 to stop the fluid flow. Sight windows 52 are provided in the sides of salt hopper 12 to allow the operator to visually detect abnormalities in the fluid levels independent from the function of the float switch. The sight windows 52 further allow the operator to view the fluid stream as the spray bars 40 and 40' are rotated to their various positions. The sight windows 52 further provide an element of safety in that the operator can view the fluid stream from ground level rather than scaling the side of the brine maker during brine production.

In the drawings and in the specification, there have been set forth preferred embodiments of the invention, and although specific items are employed, these are used in a generic and descriptive sense only, and not for purposes of limitation. Changes in the form and proportion of parts, as well as substitution of equivalents, are contemplated as circumstances may suggest or render expedient without departing from the spirit or scope of the invention as further defined in the following claims.

Thus, it can be seen that the invention accomplishes at least all of its stated objectives.

We claim:

1. A system for producing liquid compositions, comprising:

a hopper, having upper and lower ends, inner and outer surfaces, and forward and rearward sides;

a receiving tank, having an open upper end, a closed lower end, and forward and rearward sides; said receiving tank having a first opening formed therein adjacent the lower end thereof;

said lower end of said hopper being in open communication with said open upper end of said receiving tank;

at least one elongated spray bar, having opposite ends and a midpoint between said opposite ends, operatively rotatably mounted in said hopper adjacent the upper end thereof; said spray bar having a plurality of holes disposed therein to allow fluid to escape therefrom; said plurality of holes being disposed along a length of said spray bar in spaced relation to one another so that a distance between the holes proximate the midpoint is smaller than a distance between the holes proximate one of the opposite ends of said spray bar; said plurality of holes being formed so that at least one hole is disposed adjacent said midpoint with a diameter that is larger than a diameter of at least one other hole disposed adjacent at least one of the opposite ends of said spray bar; and a fluid inlet line operatively connected to and in open fluid communication with said spray bar.

2. A system for producing liquid compositions, comprising:

a hopper, having upper and lower ends, inner and outer surfaces, and forward and rearward sides;

a receiving tank, having an open upper end, a closed lower end, and forward and rearward sides; said receiving tank having a first opening formed therein adjacent the lower end thereof;

said lower end of said hopper being in open communication with said open upper end of said receiving tank;

at least one spray bar operatively rotatably mounted in said hopper adjacent the upper end thereof; said spray bar having a plurality of holes disposed therein to allow fluid to escape therefrom; at least two of said plurality of holes having diameters that are different from one another; and a fluid inlet line operatively connected to and in open fluid communication with said spray bar.

3. The system of claim 2 wherein said spray bar is elongated and has opposite ends and a midpoint between said opposite ends, the diameters of the holes disposed adjacent said midpoint being larger than the diameters of the holes disposed adjacent the opposite ends of said spray bar.

4. A system for producing liquid compositions, comprising:

a hopper, having upper and lower ends, inner and outer surfaces, and forward and rearward sides;

a receiving tank, having an open upper end, a closed lower end, and forward and rearward sides; said receiving tank having a first opening formed therein adjacent the lower end thereof; said receiving tank further being operatively pivotally movable with respect to said hopper so that said receiving tank may be selectively pivoted between open and closed positions;

said lower end of said hopper being in open communication with said open upper end of said receiving tank;

at least one spray bar operatively rotatably mounted in said hopper adjacent the upper end thereof; said spray bar having a plurality of holes disposed therein to allow fluid to escape therefrom; and a fluid inlet line operatively connected to and in open fluid communication with said spray bar.

5. The system of claim 4 further comprising a solids screen having upper and lower surfaces, operatively pivotably movable with respect to said hopper and said receiving tank between the lower end of said hopper and the open upper end of said receiving tank.

6. The system of claim 5 further comprising at least one receiving tank retaining pin to selectively secure said receiving tank in its closed position.

7. The system of claim 5 further comprising a hydraulic assembly, operatively connected to said receiving tank, to selectively move said receiving tank between said open and closed positions.

8. The system of claim 5 wherein said solids screen is pivotably movable between the lower end of said hopper and the open upper end of said receiving tank in a manner that selectively provides access to interior compartments within said hopper and receiving tank and the upper and lower surfaces of said solids screen for cleaning and maintaining the same.

9. The system of claim 5 wherein the lower end of said hopper and the open upper end of said receiving tank are shaped and sized to be received by a collection bucket operatively coupled with a mobile vehicle.

10. The system of claim 4 further comprising a solids screen, having upper and lower surfaces, operatively pivotally movable with respect to said hopper and said receiving tank.

11. The system of claim 10 further comprising at least one generally elongated receiving tank retaining pin to selectively secure said receiving tank in its closed position.

12. The system of claim 11 further comprising at least one generally elongated solids screen retaining pin to selectively secure said solids screen in a position closely adjacent said second opening of said hopper.

13. The system of claim 12 further comprising a hydraulic assembly, operatively connected to said receiving tank, to selectively move said receiving tank between said open and closed positions.

14. The system of claim 10 wherein said solids screen is adapted to freely pivot between the lower end of said hopper and the upper end of said receiving tank to selectively provide access to the inner surfaces of said hopper and receiving tank and the upper and lower surfaces of said solids screen for the cleaning and maintenance of the same.

* * * * *